INVENTOR.
Y. Nakamatsu
BY
Glascock Downing & Seebold
ATTYS.

Dec. 25, 1962

YOSHIRO NAKAMATSU

SYSTEM AND APPARATUS FOR THE AUTOMATIC RECORDING AND REPRODUCTION 3,070,374

Filed Feb. 13, 1959

2 Sheets-Sheet 2

INVENTOR.
Y. Nakamatsu
BY
Glascock Downing & Seebold
ATTYS.

3,070,374

SYSTEM AND APPARATUS FOR THE AUTOMATIC RECORDING AND REPRODUCTION

Yoshiro Nakamatsu, 62 2-chome, Shimouma-cho, Setagaya-ku, Tokyo-to, Japan

Filed Feb. 13, 1959, Ser. No. 793,210
Claims priority, application Japan Feb. 19, 1958
8 Claims. (Cl. 274—4)

The present invention relates to novel system and apparatus for the automatic recording and reproduction of recording sheet.

An object of this invention is to provide a system or an apparatus which can automatically and continuously record and/or reproduce from a plurality of rectangular recording sheets.

Another object of this invention is to provide a system or an apparatus as described above, but in which when the recording sheets have been printed with various pictures and letters, said pictures and letters can be viewed while recording or reproduction is carried out.

Said objects and other objects of this invention have been attained by the system in which feeding of the laminated recording sheets per sheet onto a recording and reproducing table plate, holding of said sheet fed on said table plate, recording or reproducing operation of said held sheet, and feeding of said recorder or reproduced sheet into the receiving chamber are sucessively carried out.

The objects and novel features of this invention will be apparent from the following detailed description, when taken together with the accompanying drawings, in which the same members are indicated by the same references and in which.

Figure 1:
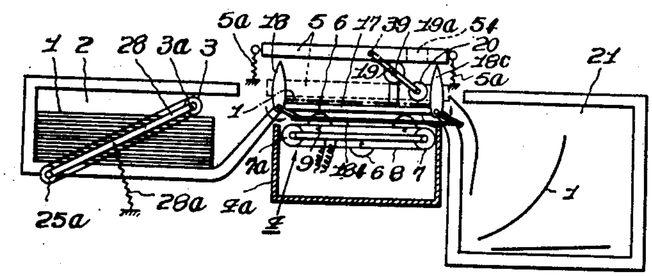
FIG. 1 is a schematic side view of one embodiment of this invention.
Figure 2:
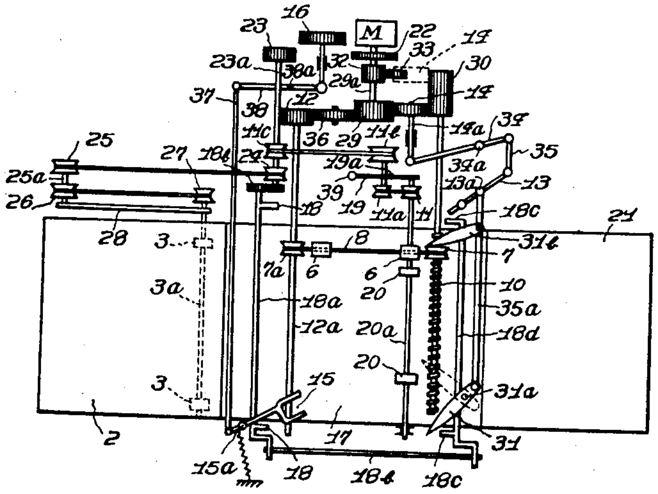
FIG. 2 is a plan view of the embodiment of FIG. 1; in which the holding plate is taken off.
Figure 3:
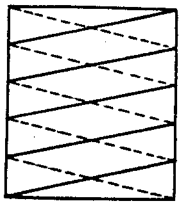
FIG. 3 is a plan view for showing the scanning state of a recording sheet to be used in this invention.

Referring to FIGS. 1, 2 and 3, a plurality of rectangular recording sheets 1, each being made, for example of a paper base and powder of magnetic material such as $Fe_2O_3$, $Fe_3O_4$, etc. applied thereon, are laminated in a box 2. The laminated sheets 1 are fed per sheet onto the recording or reproducing device 4 arranged in a box 4a, by means of rubber rollers 3. These rollers 3 are always made in contact with the top sheet by the bearing beam 28 which is pivoted at one end to the shaft 25a of the pulleys 25 and 26 and supports at its other end the shaft 3a of the rollers 3, said beam being attracted downward by a spring 28a. The rollers 3 are driven by an electric motor M through gears 22, 16 and 23, a shaft 23a, a pulley 24 attached to said shaft 23a, pulleys 25 and 26 and a pulley 27 attached to the shaft 3a, the operation of said rollers 3 being described later. The sheet fed onto the table plate 17 of the device 4 is stopped and held thereon by a holding plate 5 made of a transparent material, plastics and any other material, the operation of said plate being described later.

Recording and reproducing heads 6 are transferred in a direction together with a belt 8 driven by pulleys 7 and 7a. Along the passage of the heads 6 are arranged brushes 9, whereby signals are recorded in or reproduced from the recording sheet 1 through the heads 6. The relative positions of the heads, for example three heads are selected so that each head may carry out scanning operation upon the complete scanning of the just prior head. The heads are transferred in the direction substantially perpendicular to the scanning direction by engaging the pulley 7 with a screw rod 10 which is driven by the electric motor M in one direction through a gear train composed of a gear 29 attached to the shaft 29a of the motor M, a change gear 14 having a slidable shaft 14a and a gear 30 attached to the screw rod 10, and in another direction through a gear train composed of a gear 32 attached to the shaft 29a, a gear 33 meshed with said gear 32, the gear 14 and the gear 30, the former corresponding to the case in which the gear 14 is in the lower position as shown in FIG. 2, and the latter corresponding to the case in which the gear 14 is in upper position so as to be meshed with the gears 33 and 30. The pulley 7a is so engaged with the rotary shaft 12a that they are relatively fixed in the rotating direction, but the pulley 7a can be transferred in the axial direction relative to the shaft 12a. Accordingly, the pulley 7a can follow the axial motion of the pulley 7 while being rotated by the shaft 12a. The shaft 14a of the change gear 14 is connected to a lever 31 pivoted at a pivotal shaft 31a through a lever 34 having a pivotal shaft 34a, a link 35 articulated with said lever 34, a lever 13 having a pivotal shaft 13a and articulated at one end with said link 35, and a link 35a. Said levers and links are so designed that the change gear 14 and the lever 31 take the dotted position in FIG. 2 at the starting of the scanning operation. Accordingly, when the scanning of one surface of the recording sheet 1 by the heads 6 have completed, the lever 31 is pushed by the pulley 7 and the lever 31 is turned counterclockwise around its pivotal shaft 31a and the levers 13 and 34 also are turned counterclockwise through the links 35a and 35, the turned positions of said levers and links being shown in FIG. 2 by full lines, whereby the change gear 14 is meshed with the gears 29 and 30 as shown in FIG. 2 and the rotation of the screw rod 10 is reversed. The belt 8 is driven by the motor M through the gear 29, an intermediate gear 36, a gear 12 and the pulley 7a.

When a head 6 is transferred to the lower position, the lever 15 is turned clockwise around its pivotal shaft 15a, whereby the gear 16 is meshed with the gears 22 and 23 through articulated links 37 and 38 and the shaft 23a is rotated. By this rotation of the shaft 23a is raised a nail pieces 18 attached to the shaft 18a, because said shaft 18a is rotated by said shaft 23a through a gear train 18b. With said raising of the pieces 18, other nail pieces 18c also are raised, because the rotary shaft 18d of said pieces 18c is rotated in the same manner as the shaft 18a through a link 18b which is articulated in the angle ends of the shafts 18a and 18d. By raising of said nail pieces 18 and 18c, the holding plate 5 is raised against the spring force of the springs 5a attracting said plate downward. When the plate 5 is raised, a lever 19 articulated at one end 39 thereof to the plate 5 and pivoted to a pivotal shaft 19a is turned clockwise, thereby rollers 20 supported by a shaft 20a which is rotatably supported by said lever 19 are brought in contact with the top recording sheet. On the other hand, the rollers 20 are driven by the shaft 23a through the pulleys 11c, 11b, 11a and 11, thereby the top recording sheet is fed into the receiving box 21 in the turned state as shown in FIG. 1. In this time, the rotation of the shaft 23a is further transmitted to the rollers 3 through the pulleys 24, 25, 26 and 27 and the next recording sheet is fed onto the table plate 17 of the device 4 as described above. When the heads 6 are transferred upward again, the lever 15 is restored to the state in FIG. 2 and the gear 16 is released from the gears 22 and 23, thereby the rollers 3 and 20 are stopped. When the nail pieces 18 rotate by one turn, the holding plate 5 is set down again by the springs 5a to hold the newly fed recording sheet.

In this state, the rollers 20 are inserted into the holes 5*b* of the holding plate 5, so that the close holding of the recording sheet by the holding plate is assured. The gear ratio of the gear train 18*b* and the speed of the rollers 3 and 20 are so selected that one cycle of the motion of the holding plate 5 is completed just after the time when the recorded or reproduced sheet on the table plate 17 has been fed into the box 21 and a new recording sheet has been fed onto the table plate 17 and that the gear 16 is released upon the completion of the above operations. When the pulley 7 is restored to the upper starting position, the same lever 31*b* as the lever 31 is pushed upward by the pulley 7 and the levers 34 and 13 are restored to the starting positions, thereby the change over gear 14 is brought in mesh with the gears 33 and 30.

The above-mentioned operation is repeated and the feeding, holding, and scanning of the recording sheets are continuously and automatically carried out.

Figures 4, 5:
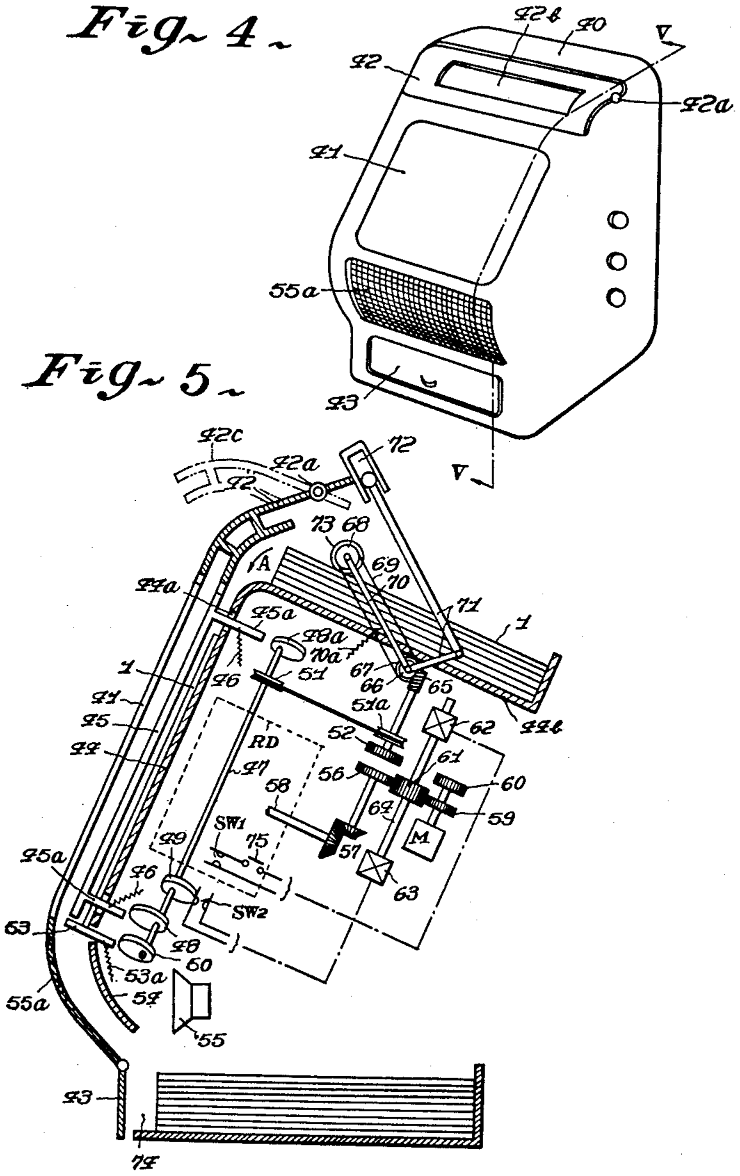
FIG. 4 is a perspective view of another embodiment of this invention.
FIG. 5 is a schematic side view of the embodiment of FIG. 4, sectioned along the line V—V in FIG. 4.

Referring to FIGS. 4 and 5, the apparatus comprises a box 40 having a slant window 41, a turnable cover 42 supported by a pivotal shaft 42*a*, a hinged door 43 and a speaker window 55*a*. In the box 40, there are a table plate 44 arranged under the window 41 so as to be parallel thereto, a transparent holding plate 45 arranged between the window 40 and the plate 44 and having guide arms 45*a* passing through holes 44*a* of the plate 44 so as to be moved in the direction perpendicular to the surface of the plate 44, said plate 45 being attracted onto the plate 44 by springs 46, a supporting plate 44*b* for mounting a plurality of rectangular recording sheets 1 thereon, said plate 44*b* being unified with the plate 44, a rotary shaft 47 coupled with a gear 52 through pulleys 51 and 51*a*, cams 48, 48*a*, 49 and 50 which are supported by said shaft 47, a shutter plate 53 urged always onto the cam 50 by means of a spring 53*a*, an arcuate guide plate 54, a speaker 55 arranged inside said guide plate 54, a gear 56 which drives, through a bevel gear train 57, a rotary shaft 58 for driving a recording and reproducing head driving mechanism such as for example as illustrated in FIGS. 1 and 2 and schematically shown by dotted line R—D, an electric motor M, a gear 60 driven by said motor, a change gear 61 meshable with the gear 56 or 60, electromagnetic clutches 62 and 63 coupled with the shaft 64 of the gear 61, said clutch 62 acting to mesh the gear 61 with the gears 52 and 60 when it is excited and said clutch 63 acting to mesh the gear 61 with the gears 56 and 59 when it is excited, an electric switch SW1 which is closed by the recording or reproducing head at its starting position, another electric switch SW2 which is closed by the cam 49 upon its rotation of one turn, and a starting push button 75 connected in series to the switch SW1.

The cams 48, 48*a*, 49 and 50 are so designed that during one turn of the shaft 47, the holding plate 45 is first detached from the table plate 44 and then pressed again to the table plate 44 to hold the recording sheet therebetween and that the shutter plate 53 is first pulled in to open the lower opening formed between the holding plate 45 and the table plate 44 to let the recorded or reproduced sheet slip down and then is protruded to shut off said opening to hold the recording sheet fed newly between the plates 44 and 45.

A worm 65 attached to the shaft of the gear 52 is meshed with a worm wheel 66 to the shaft of which is attached a pulley 67. A turnable supporter 70 is attached at its one end to the shaft of said pulley 67 and supports a pulley 68 at its other end, said supporter 70 being always urged downward by a spring 70*a*. A link mechanism 71 is attached at one end thereof to the shaft of said pulley 67 and is slidably engaged at the other end thereof in a guide member 72 supported by the turnable cover 42.

The operation of the embodiment of FIGS. 4 and 5 is as follows. First, a plurality of rectangular recording sheets 1 are put on the supporting plate 44*b* in such opened state of the cover 42 as shown by chain line 42*c*. In this state, the link mechanism 71 is pushed downward by the guide member 72, thereby the supporter 70 is turned clockwise to the upper position against the spring force of the spring 70*a*. Accordingly, mounting of the recording sheets on the supporting plate 44*b* is not disturbed. After said mounting, the cover 42 is shut out, then the supporter 70 is attracted by the spring 70*a* to the position as shown to press the recording sheets by the rollers 73 attached to the shaft of the pulley 68. Next, when the push button 75 is pushed, the circuit of the electromagnetic clutch 62 is closed, because the electric switch SW1 is in closed position, thereby the gear 61 is brought in mesh with the gears 52 and 60. Accordingly, the shaft of the gear 52 is driven by the electric motor M and the rollers 73 are driven through the belt 69, whereby the top recording sheet 1 is fed toward arrow direction A. On the other hand, the shaft 47 is driven by the gear 52 through the pulleys 51 and 51*a*. With the rotation of the shafts 47, the holding plate 45 is first pushed outward by the cams 48 and 48*a*. In this time, the shutter plate 53 is attracted rearward by the spring 53*a*, because the projected portion of the cam 50 turns rearward, so that the recording sheet which has been previously held between the holding plate 45 and the table plate 44 is slipped down through the guide plate 54 into the receiving pocket 74, and then a new recording sheet fed by the rollers 73 is fed between the plates 45 and 44. However, since the cam angle of the cam 50 is so selected that the shutter plate 53 is pushed outward just after the previous sheet has slipped down, the new recording sheet is held between the plates 45 and 44. Then, the holding plate 45 is pressed to the plate 44 to hold the sheet therebetween. After one rotation of the shaft 47, the electric switch SW2 is closed by the cam 49 and the electromagnetic clutch 63 operates, thereby the gear 61 is meshed with the gears 56 and 59 and the shaft 58 for driving any mechanism for operating the recording and reproducing heads is driven through the bevel gear train 57.

Upon the complete scanning by the heads, the electric switch SW1 is again closed and the above-mentioned operation is repeated. In such a manner as described above, the recording or reproducing operation is automatically and continuously carried out so far as the starting push button 75 is in closed state.

For ensuring the change over operation of the clutch 62 or 63, any conventional time switch may be connected in series to the electric switch SW1 and SW2, said time switch acting to open the circuit after the excitation thereof.

In the reproducing operation, if necessary, the sound can be broadcasted by the speaker 55 through the speaker window 55*a*.

In the embodiment in FIGS. 4 and 5, any desirable number of the recording sheets can be manually treated by manually controlling the starting push button.

According to the system and apparatus of this invention, recording and reproduction of a plurality of the recording sheets can be continuously and automatically carried out by a simple mechanism and more particularly, when recording sheets having various pictures and letters thereon are used as the recording sheets, recording and reproducing operation can be carried out while viewing said pictures and letters by using merely a transparent holding plate.

Although in the above embodiments, I have described mainly in connection with the electric recording and reproduction, but the characteristic features of this invention can be applied to any other recording and reproducing system such as for example optical system or sound system.

Although I have shown and described my invention in connection with preferred embodiments, it will be understood that the present invention is not limited thereto and many modifications will be clear to those skilled in the art without depending from the true spirit and scope of my invention.

What I claim is:

1. In an apparatus for the automatic recording and reproducing of recording sheets, each sheet being made of a paper base and magnetic material applied thereon, said apparatus comprising, in combination, a chamber for stacking a plurality of recording sheets therein; a recording and reproducing table plate positioned near said chamber and adapted to receive a sheet fed from said chamber thereon; a device for feeding said stacked sheets one at a time from said chamber onto said table plate, said device comprising rollers pressed on said uppermost sheet of said stacked sheet in said chamber, a pulley train adapted to rotate said rollers so as to shift the top sheet of said stack sheet toward said table plate, a bearing beam supporting the shafts of said rollers and supported so as to press said rollers onto the stacked sheet in said chamber, and a change over gear train consisting of a driven gear coupled with said pulley train, a driving gear driven by a main motor, an intermediate gear which is shiftably supported so as to be meshed with said driven and driving gear at one shifted position and to be disengaged from said driven and driving gear at another shifted position, and a link device actuated by the later describing head at the position of its complete transference and acting to make said intermediate gear mesh with the other said gears; means for holding the fed sheet on said table plate, said means comprising a holding plate pressed normally on said table plate by spring means, and rotatable members having, respectively, eccentric rotary shafts, said members pushing said holding plate against the force of said spring means one time per one rotation thereof so as to detach said holding plate from said table plate; a device for recording in or reproducing from said held sheet, said device comprising at least one recording and reproducing head, means supporting said head and moved by a pulley train in one direction of said recording and reproducing table plate so as to transfer said head along said table plate in said direction, a member coupled with said means and coupled with the said main motor through a gear train and a link mechanism so as to be driven to transfer said means along said table plate in the direction perpendicular to the former direction, said gear train being of an exchange over type and being exchanged to one rotary direction and another rotary direction, respectively, at one and another position of said link mechanism, and a member actuated by said head at the position of completion of scanning transference of said head and acting to operate said link mechanism so as to bring said gear train to one position and another member actuated by said head at the starting position of said head and acting to operate said link mechanism so as to bring said gear train to another position; a receiving chamber for receiving the recorded or reproduced sheet therein; and a mechanism for feeding said recorded or reproduced sheet from the recording and reproducing table plate onto said receiving chamber, said mechanism comprising rollers, the rotary shaft of which is linked with the said holding plate which is supported by therein rotary so that said rollers are made in contact with the sheet held on the recording and reproducing table plate only when said holding plate is aparted from, and a pulley train for driving the shaft of said rollers, said pulley train being coupled with the intermediate gear of said change over gear train of said device for feeding said stacked sheets.

2. The apparatus of claim 1, in which said recording and reproducing table is sloped downwardly from adjacent said chamber for stacking a plurality of recording sheets thereon to said receiving chamber.

3. In an apparatus for the automatic recording or reproduction of recording sheets as claimed in claim 1, wherein the means for holding the fed sheet on the recording and reproducing table plate consists of a holding plate supported parallel to said sheet, said holding plate and said recording and reproducing plate being arranged in substantially vertical position, and wherein a shutter plate is provided for making the sheet placed on said table plate slip down or stop according to opening and closing of said shutter plate, and said receiving chamber being positioned under said shutter plate so as to receive the sheet which has slipped down through the opening formed by opening of said shutter plate.

4. An apparatus for the automatic recording or reproduction of recording sheets as claimed in claim 1, and a box enclosing all said devices, means and mechanism, a turnable cover for said box so connected to the recording sheet feeding rollers that said feeding rollers are raised when said cover is opened to place a plurality of the recording sheets on the supporting plate and are pressed on the stacked recording sheets when said cover is shut down, said cover having an inner curved surface adapted to guide the sheet fed toward the table plate by said rollers.

5. In an apparatus for automatic recording or reproduction of recording sheets as claimed in claim 4, in which the passage through which the recorded or reproduced sheet is guided in the turned state is of generally arcuate configuration, and a speaker to broadcast sound located at said passage.

6. In an apparatus for the automatic recording or reproduction of recording sheets, each sheet being made of a paper base and magnetic material applied thereon, said apparatus comprising a chamber for stacking a plurality of recording sheets therein; a recording and reproducing table plate positioned near said chamber; a device for feeding said stacked sheets one at a time successively from the uppermost sheet, said device including feed rollers pressed on said uppermost sheet and means for rotating said rollers to feed said sheets one at a time onto said recording and reproducing table plate and said device being provided with a mechanism for raising said rollers from the bottom of said chamber when the recording sheets are to be newly stacked onto said chamber; means for holding the fed sheet stationary on said table plate including a holding plate and a means for pressing or detaching said holding plate on and from said table plate; a device for recording in or reproducing from said held sheet, said last-mentioned device comprising a movable mounting adjacent to and movable parallel to said table, a plurality of recording and reproducing heads on said mounting, said mounting constituting means for transferring said heads along the sheet held on the recording and reproducing table plate to successively scan said sheet; a receiving chamber for receiving the recorded or reproduced sheet therein; a mechanism for feeding said recorded or reproduced sheet from the recording and reproducing table plate onto said receiving chamber; and a drive means for driving, successively one after another, said device for feeding said stacked sheets one at a time from the chamber containing said stacked sheets onto said recording and reproducing table plate, said means for holding the sheet fed on said table plate, said device for recording or reproduction, and said mechanism for feeding the recorded or reproduced sheet from said table plate onto said receiving chamber.

7. In the combination af an apparatus for oral recording and audible reproduction of information for use in connection with visible information and a plurality of cards, each card having a picture or other visible information on one side thereof and a magnetic sound track on the other side thereof, said apparatus comprising a first chamber adapted to receive a stack of said cards, an operating table adjacent said first chamber, means to move said cards one at a time in succession to said table, means to locate and hold said cards in predetermined position on said table, window means on one side of said table located so that the visible information may be viewed by the operator of the device, magnetic scanning means including at least one magnetic recording and reproducing head on the other side of said table movably mounted to pass close to the magnetic sound track of each card when located on said table, loud speaker means operatively connected to said scanning means to make recorded material from said magnetic sound track audible, means operative upon completion of scanning of each card to remove that card from the operating table and to actuate said means to move said cards to said table, whereby the visible information on each card in succession is supplemented by the audible information recorded on that card.

8. The device of claim 7, in which said scanning means includes three scanning heads equally spaced on an endless belt, a pair of pulleys mounted to carry said endless belt and so located that each head in succession is passed parallel and close to said operating table, one of said pulleys being mounted on a threaded shaft whereby relative rotation between said shaft and said pulley moves said belt in a plane normal to said shaft whereby successive scanning heads will scan successive parallel lines of magnetic sound track on a card mounted on said operating table.

References Cited in the file of this patent

UNITED STATES PATENTS

| | | |
|---|---|---|
| 2,244,242 | Buhler | June 3, 1941 |
| 2,282,067 | Lang | May 5, 1942 |
| 2,565,459 | Willett | Aug. 21, 1951 |
| 2,814,440 | McWhirter | Nov. 26, 1957 |
| 2,842,615 | Gruver | July 8, 1958 |
| 2,940,763 | Hoshino | June 14, 1960 |
| 2,946,593 | Beyer | July 26, 1960 |